(12) United States Patent
Ukhanov et al.

(10) Patent No.: US 11,016,119 B1
(45) Date of Patent: May 25, 2021

(54) MONOLITHIC ATOMIC FORCE MICROSCOPY ACTIVE OPTICAL PROBE

(71) Applicants: Alexander A. Ukhanov, Albuquerque, NM (US); Gennady A. Smolyakov, Albuquerque, NM (US); Fei Hung Chu, Albuquerque, NM (US); Chengao Wang, Albuquerque, NM (US)

(72) Inventors: Alexander A. Ukhanov, Albuquerque, NM (US); Gennady A. Smolyakov, Albuquerque, NM (US); Fei Hung Chu, Albuquerque, NM (US); Chengao Wang, Albuquerque, NM (US)

(73) Assignee: ACTOPROBE LLC, Albuquerque, NM (US)

(*) Notice: Subject to any disclaimer, the term of this patent is extended or adjusted under 35 U.S.C. 154(b) by 0 days.

(21) Appl. No.: 15/484,747

(22) Filed: Apr. 11, 2017

Related U.S. Application Data

(60) Provisional application No. 62/415,097, filed on Oct. 31, 2016.

(51) Int. Cl.
*G01Q 60/38* (2010.01)
(52) U.S. Cl.
CPC .................................. *G01Q 60/38* (2013.01)
(58) Field of Classification Search
CPC ........ G01Q 10/00; G01Q 10/02; G01Q 10/04; G01Q 10/045; G01Q 10/06; G01Q 10/065; G01Q 20/00; G01Q 20/02; G01Q 20/04; G01Q 60/00; G01Q 60/24; G01Q 60/38; G01Q 60/40; G01Q 70/00; G01Q 70/02; G01Q 70/06; G01Q 70/08; G01Q 70/16
USPC ........ 850/4, 6, 5, 33, 41, 42, 40, 53, 55, 56, 850/59, 60
See application file for complete search history.

(56) References Cited

U.S. PATENT DOCUMENTS

| | | | | |
|---|---|---|---|---|
| 5,141,319 A * | 8/1992 | Kajimura | ............... | B82Y 35/00 356/486 |
| 5,982,009 A * | 11/1999 | Hong | ..................... | G01Q 20/02 250/227.19 |
| 8,201,268 B1 * | 6/2012 | Ho | ......................... | G01Q 60/22 850/59 |
| 9,482,691 B1 * | 11/2016 | Ukhanov | ............... | G01Q 20/04 |
| 9,869,695 B1 * | 1/2018 | Drechsler | .............. | G01Q 20/02 |
| 2006/0237639 A1 * | 10/2006 | Kley | ..................... | G01Q 20/02 250/234 |
| 2008/0144029 A1 * | 6/2008 | Li | ........................ | G01J 1/4228 356/327 |

* cited by examiner

*Primary Examiner* — Jason L McCormack

(57) ABSTRACT

A new monolithic Atomic Force Microscopy (AFM) active optical probe monolithically integrates a base of the probe, a cantilever, a semiconductor laser source, an AFM tip, and a photodetector into a robust, easy-to-use single semiconductor chip to enable AFM measurements, optical imaging, and optical spectroscopy at the nanoscale.

10 Claims, 6 Drawing Sheets

MONOLITHIC ATOMIC FORCE MICROSCOPY ACTIVE OPTICAL PROBE

CROSS REFERENCE TO RELATED APPLICATIONS

This application claims benefit and priority of U.S. provisional application Ser. No. 62/415,097 filed Oct. 31, 2016, the entire disclosure of which is incorporated herein by reference.

FIELD OF THE INVENTION

The present invention relates to AFM microscopy and near-field optical microscopy probes and, in particular, to a monolithic AFM active optical probe capable of performing both conventional AFM measurements and optical imaging and spectroscopy at the nanoscale.

BACKGROUND OF THE INVENTION

Optical characterization at the nanoscale currently requires instruments such as NSOM (near-field scanning optical microscope), TERS (tip-enhanced Raman spectroscopy), or hybrid AFM (that includes a specialized far-field optical microscope).

Attempts at integrating atomic force microscopy and optical techniques have already been made and several products based on these schemes have found their way into the market. Commercially available, AFM tips with integrated waveguides (hollow tips) are used in conjunction with an external laser source [Celebrano 2009]. This high-cost approach suffers from inherent limitations in terms of optical resolution and light power that can be delivered. To achieve high lateral resolution the size of the near-field aperture needs be reduced, thus leading to an exponential decrease of optical power output. This approach has limited applications to near-field microscopy with ultimate resolution of about 50 nm, but is not appropriate for optical spectroscopy because of small power output.

Other approaches aimed at better integration of light source and AFM tip have generally involved either attaching a prefabricated light source (edge emitter, VCSEL, or LED) above a Si AFM cantilever probe (hybrid approach) [Bargiel 2006, Kingsley 2008] or fabrication of the light source directly on the AFM tip [Heisig 2000a, Heisig 2000b, Hoshino 2008, Hoshino 2009]. In these instances, the optical detectors were not integrated into the probes. The hybrid approach has only been shown to work in research labs and it is difficult to imagine how optical probes can be fabricated cost-effectively to make them affordable for a wider scientific community. In addition, VCSELs, commonly used in this approach, are limited in their optical output power.

In addition, single, integrated photodetectors have also been fabricated on AFM tips [An 2008]. The photodetector-only approach [An 2008] does not address the difficulties of aligning the light source onto the AFM tip, and the requirement to reduce detector size in order to achieve spatial resolution directly contradicts the requirement to have the largest possible detection area necessary to obtain high sensitivity levels for optical spectroscopy on nanoscale.

An AFM tip with integrated LED light source and photodetector has been demonstrated [Sasaki 2000], but while the photodetector was monolithically fabricated into the probe, the light source (a GaAs LED) was simply glued onto the cantilever chip. This is insufficient to meet the requirement of high power, single wavelength operation.

In view of the above problems, we proposed a novel class of probes for atomic force microscopy (AFM active optical probe—AAOP) by integrating a laser source and a photodetector monolithically into the AFM probe [Actoprobe 2015]. The AAOPs were designed to be used in a conventional AFM to enhance its functionality by including that of the above mentioned instruments (NSOM, TERS, hybrid AFM). These unique optical probes were designed to perform the functions of conventional AFM probes and, in addition, to simultaneously provide information about optical properties of the sample at the nanoscale. The AAOP concept was based on combining a diode laser and an AFM probe monolithically. The AAOP was designed as an intracavity probe, that is, the AFM probe tip was part of the laser cavity. The AAOP consisted of a GaAs-based cantilever with the AFM probe mounted on a conventional Si chip. Although technically feasible, the GaAs/Si hybridization poses serious problems that may affect the yield of the fabrication process due to the strain resulting from bonding of materials with different thermal expansion constants, i.e. silicon, indium and GaAs.

SUMMARY OF THE INVENTION

The object of the present invention is to provide a novel class of probes for atomic force microscopy (monolithic AFM active optical probe—ML AAOP) by integrating a laser source and a photodetector monolithically into the AFM probe, based entirely on GaAs or similar lasing materials, thus avoiding the detrimental GaAs/Si hybridization.

The present invention envisions a method of fabricating a monolithic, integrated optical AFM probe. The most widely used probes for atomic force microscopy are fabricated using silicon technology. In contrast, the ML AAOPs are fabricated entirely from GaAs, a semiconductor material suitable as the basis for optical device fabrication. The laser and detector functionality is enabled by an epitaxially grown structure. Edge-emitting laser diodes, light guides, and efficient photodetectors are fabricated by patterning the active region (epi-layer), while the AFM tip is fabricated from a specially grown GaAs epitaxial overcap layer on top of the ridge waveguide at the end of a cantilever formed from the epi-layers of the laser structure. The choice of GaAs is motivated by the large base of established fabrication technology, which allows for time- and cost-effective fabrication of the probes. Practice of the present invention can be easily extended to alternative III-V semiconductors such as InP, GaP, GaSb, and GaN to expand the available wavelength coverage from UV to visible and mid-infrared.

In an illustrative embodiment of the present invention, the laser cavity is defined by two distributed Bragg reflector (DBR) mirrors. The first laser mirror is a standard first-order DBR grating (period $\lambda/2n_{eff}$, where $\lambda$ is the laser wavelength and $n_{eff}$ is the effective refractive index of the GaAs waveguide) that ensures single longitudinal mode for the laser operation. The second laser mirror is a second-order DBR grating (period $\lambda/n_{eff}$) located at the end of the cantilever. It serves as a folding mirror that couples the light (an intracavity laser mode) vertically into the AFM tip fabricated from a specially grown GaAs epitaxial overcap layer on top of the ridge waveguide. Thus, the light generated by the laser is coupled into the surface mode of the GaAs probe (conic shape micro-prism) and transferred to the tip apex. The tip itself is a total internal reflection prism that plays the role of an output mirror, the third mirror, in the laser cavity. The GaAs micro-prism guides the laser light into the tip apex and generates a strong surface optical mode at the GaAs/air interface. It creates a high magnitude optical field highly localized at the apex of the AFM tip, sufficiently strong to enable effective excitation for nanoscale TERS.

In another illustrative embodiment of the present invention, the laser is a second-order distributed feedback (DFB) surface-emitting laser that employs its second-order waveguide grating to outcouple the laser light vertically into the AFM tip fabricated from a specially grown GaAs epitaxial overcap layer on top of the ridge waveguide. Again, the light generated by the laser is coupled into the surface mode of the GaAs probe (conic shape micro-prism) and transferred to the tip apex. Practice of the present invention can be easily extended to graded second-order DFB lasers for much more efficient power extraction in order to increase the optical power delivered to the GaAs probe. Graded second-order DFB lasers employ aperiodic gratings with symmetrically changing grating period to achieve a very significant enhancement of power extraction in vertical direction [Xu 2012].

Practice of the present invention can be advantageous to provide high performance, low cost probes for atomic force microscopy with enhanced functionality to include that of NSOM, TERS, or hybrid AFM. The ML AAOP with its integrated light source and detector has the potential to outperform the above-mentioned technologies for optical characterization at the nanoscale.

The high refractive index of GaAs accounts for a resolution increase compared to hybrid AFM that employs an optical microscope in the far field: the resolution increases by the factor of the refractive index of GaAs (~3.6). Since light source and detector are integrated into the probe, the difficulty of focusing the optical microscope on the correct surface area does not apply. This also puts the detector very close to the sample, which results in increased sensitivity.

The high refractive index of GaAs also accounts for an advantage of the ML AAOP compared to NSOM. The ML AAOP is operated with an aperture large enough, so that the frequency is just above the waveguide cut-off. Since NSOM uses glass with lower refractive index, it has to be operated below cut-off frequency to achieve the same resolution. This translates into a dramatic loss in transmission through the aperture (several orders of magnitude), which leads to low signal-to-noise ratio and thereby low sensitivity.

The ML AAOP can also be operated apertureless using surface plasmons, as an optical antenna [Vedantam 2009, Novotny 2011]. TERS works similarly, but its performance is challenged by scattered light from the far field, leading to a large background signal. In the ML AAOP the light is supplied through the tip, hence there is no scattered light and therefore significantly reduced background. Furthermore, the difficulties associated with laser alignment onto the tip and with imaging the signal onto a detector or spectrometer are avoided with the ML AAOP.

The enhanced functionality can be achieved at a price much smaller than the cost of purchasing a dedicated NSOM or TERS instrument. The ML AAOP fabrication technology essentially combines two well-developed technologies: AFM probe fabrication and edge-emitting semiconductor laser fabrication. The fabrication process avoids the detrimental GaAs/Si hybridization and should allow for high-volume manufacturing, resulting in a cost-effective, affordable product that can be adopted for use by all current owners of atomic force microscopes. The instrumentation in addition to an existing AFM would just require laser driver and detection electronics. The cost advantage compared to a NSOM instrument would be on the order of 10-100 times, and ML AAOP has the potential to outperform NSOM as described above. The low cost and simplicity of use of ML AAOPs will open up new important opportunities for the application of near-field optical microscopy for research and engineering in academia and industry. These and other advantages of the present invention will become more readily apparent from the following detailed description taken with the following drawings.

DETAILED DESCRIPTION OF THE INVENTION

The ML AAOP concept is based on combining a diode laser and an AFM probe monolithically. Some preferred embodiments of the invention will be described below in detail based on the drawings.

Embodiment 1

Figure 1A:
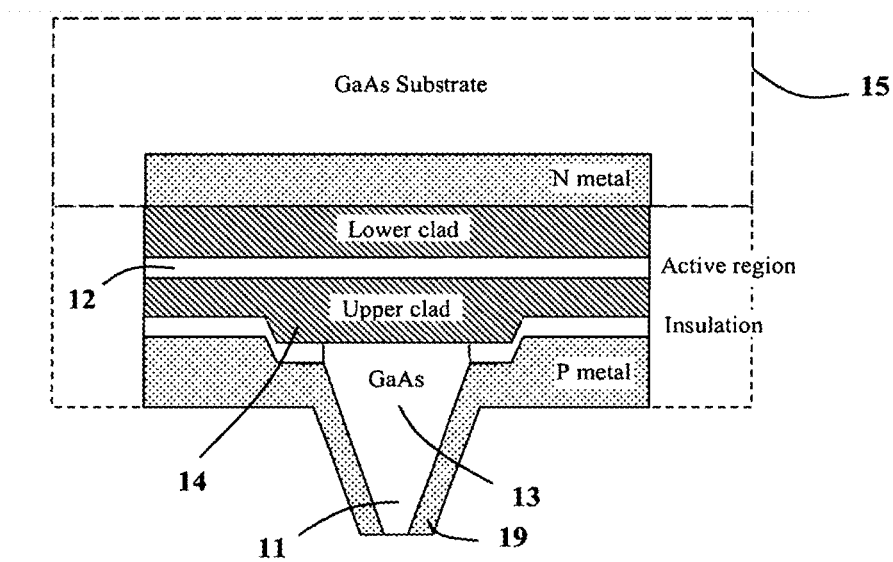
FIGS. 1A, 1B, and 1C are schematic illustrations of Embodiment 1 of a monolithic AFM active optical probe according to the invention, showing its configuration: (A) cross-sectional view, (B) side view, and (C) bottom view.
Figure 1B:
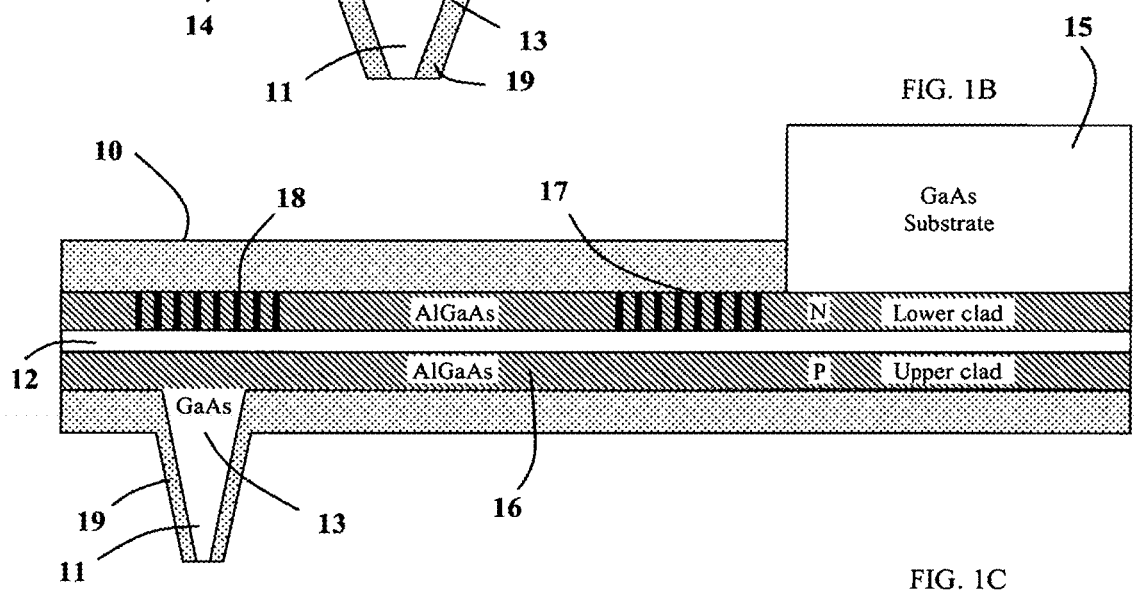
Figure 1C:
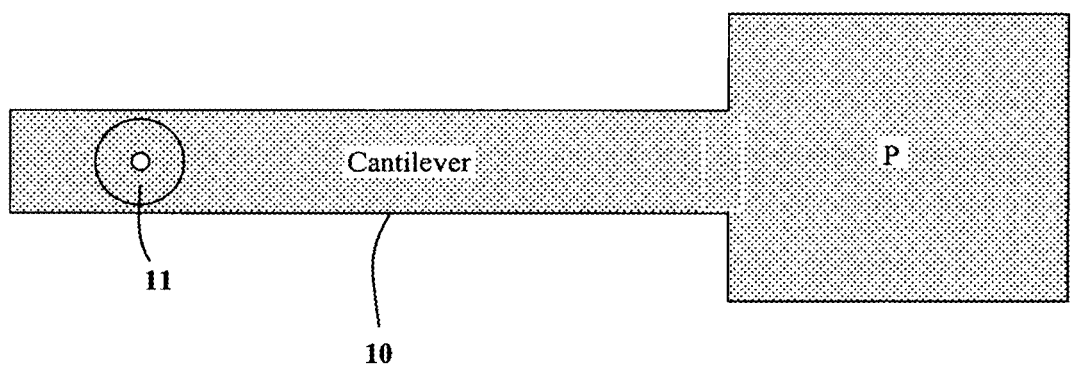
Figure 2:
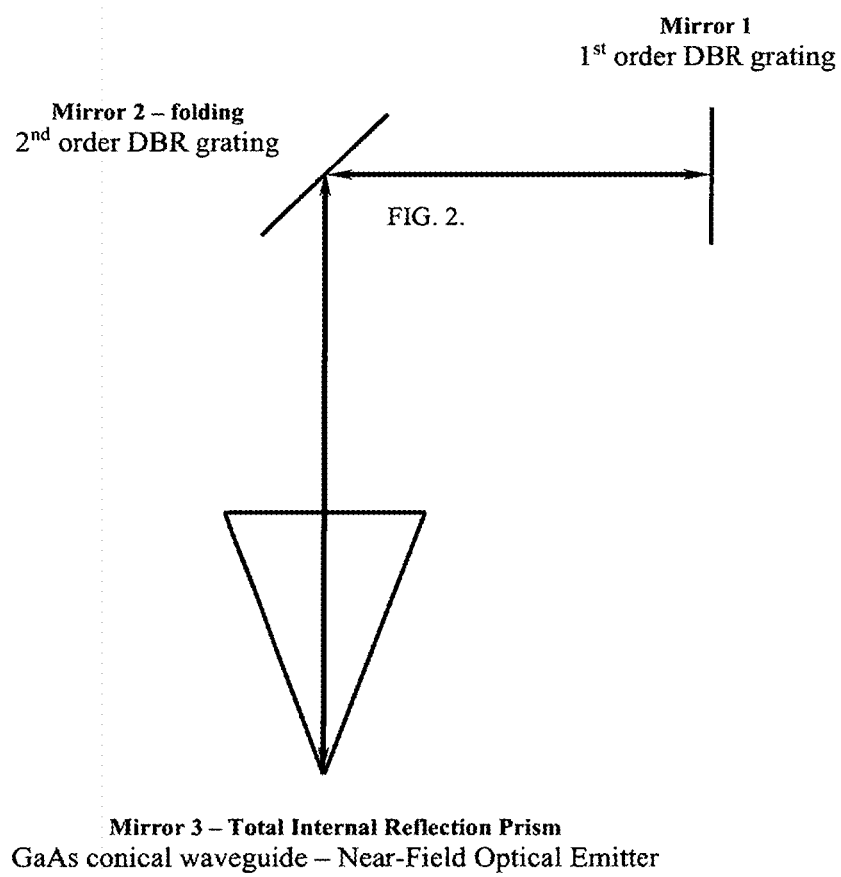
FIG. 2 is a schematic illustration of the AAOP optical scheme according to Embodiment 1 of the invention.

The envisioned ML AFM Active Optical Probe (AAOP) is shown in FIG. 1. In this Figure we present a cross-sectional view of the probe, a side view and a bottom view. The ML AAOP consists of a cantilever 10 with the an AFM probe tip 11 fabricated from a GaAs-based epitaxial laser wafer. The cantilever 10 is monolithically connected to a probe base fabricated from the same GaAs-based epitaxial laser wafer. The ML AAOP is designed as an intra-cavity probe, i.e. the AFM probe is part of the laser cavity as shown in an equivalent optical schematic of the device in FIG. 2. This increases laser light coupling into the optical near field at the apex of the AFM probe by a factor of 10,000 [Partovi 1999]. The ML AAOP is a very efficient optical near-field nano-emitter.

The most widely used probes for atomic force microscopy are fabricated using silicon technology. In contrast, the ML AAOPs are fabricated from GaAs, a semiconductor material suitable as the basis for optical device fabrication. The laser and detector functionality is enabled by an epitaxially grown structure. Edge-emitting laser diodes, light guides, and efficient photodetectors are fabricated by patterning the active region 12 (epi-layer), while the AFM tip 11 is fabricated from a specially grown GaAs epitaxial overcap layer 13 on top of the ridge waveguide 14 at the end of the cantilever 10 formed from the epi-layers of the laser structure. The cantilever with the AFM probe is fabricated from an epitaxial laser structure MBE-grown on a GaAs substrate 15. The laser 16 is designed as an electrically pumped edge emitting laser (ridge waveguide), and the epitaxial structure is a typical quantum well edge emitter structure with 10-nm wide $Ga_{0.85}In_{0.15}As$ quantum wells imbedded in a GaAs waveguide and surrounded by doped $Al_{0.7}Ga_{0.3}As$ cladding layers, one of them is n-doped and the other p-doped. The structure also includes an $Al_{0.95}Ga_{0.05}As$ etch stop layer to facilitate substrate removal in order to fabricate a cantilever that consists only of the ~5-μm thick epitaxial laser structure. The choice of GaAs is motivated by the large base of established fabrication technology, which allows for time- and cost-effective fabrication of the probes. Practice of the present invention can be easily extended to alternative III-V semiconductors such as InP, GaP, GaSb, and GaN to expand the available wavelength coverage from UV to visible and mid-infrared.

The first laser mirror, mirror #1, is a standard first-order DBR grating 17 (period $\lambda 2n_{eff}$, where is the laser wavelength and $n_{eff}$ is the effective refractive index of the GaAs waveguide) that ensures single longitudinal mode for the laser operation. Light generated by the laser is coupled into the surface mode of the GaAs probe (conic shape micro-prism) and transferred to the tip apex as follows: at the end of the cantilever and inside the laser cavity, mirror #2, a second-order DBR grating 18 (period $\lambda/n_{eff}$), couples the light (an intracavity laser mode) vertically into the AFM tip. It serves as a folding mirror.

The tip 11 itself is a total internal reflection prism and plays the role of an output mirror, mirror #3, in the laser cavity. The GaAs micro-prism guides the laser light into the tip apex and generates a strong surface optical mode at the GaAs/air interface. It creates a high magnitude optical field highly localized at the apex of the AFM tip, sufficiently strong to enable effective excitation for nano-scale Raman Spectroscopy-Tip Enhanced Raman Spectroscopy (TERS). Finite Difference Time Domain (FDTD) simulations predict that for a bare GaAs micro-prism the near-field light ($\lambda$=980 nm) can be focused to a spot size of 160 nm in diameter and with about 30 mW power. By coating the micro-prism with a thin layer of gold 19 (50 nm), the spot size decreases to dimensions less than 50 nm but the power reduces by a factor of about 1000. Depending on application, the probe can be apertureless or have a nanometer-size aperture at the apex. In the case of the apertureless probe, a surface plasmon mode is excited in the Au coating, providing a very strong optical field at the apex of the AFM tip. In the case of the probe with a nanometer-size aperture, the tip operates as an optical waveguide below cut-off frequency and optical radiation is transmitted through the aperture.

For conventional TERS, the far-field optical power is on the order of 20-100 mW. Since with the ML AAOP, the light can be coupled to the near field more efficiently, substantially less optical power is necessary to obtain the same electric field strength at the tip apex. We estimate that an optical power in the range of 0.5-10 mW is sufficient, and can easily be provided by semiconductor lasers.

The main difference of the ML AAOP from other AFM probes is that the ML AAOP is designed to do optical nano-scale spectroscopy together with AFM imaging. The ML AAOP concept is based on combining a diode laser and an AFM probe monolithically.

Front- and back sides of the chip are metallized in the appropriate places to make electrical contact to laser structure and to provide high reflectivity for optical displacement monitoring used to read out tip deflection for AFM imaging.

Figure 3:
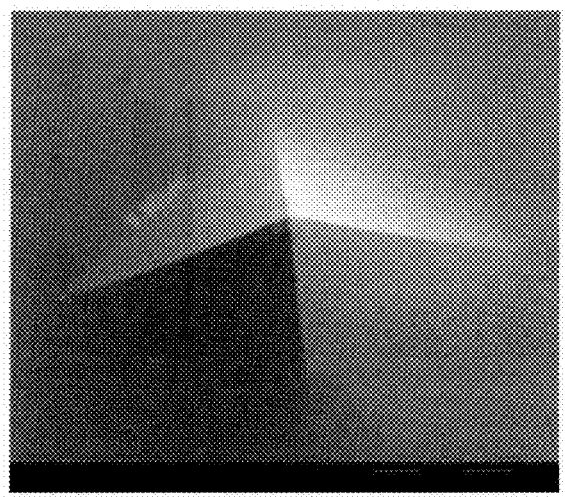
FIG. 3 is a close-up view of the tip tilted 25°. The base of the tip is about 10 µm×10 µm. The tip radius achieved here is on the order of 50 nm.

The GaAs probe tip 11 has a conical geometry with 40° angle and a base of 10-12 μm (FIG. 3). This geometry makes this probe an optical antenna that focuses laser radiation into a diffraction limited spot of 280 nm diameter for a laser wavelength of 1 μm as a result of total internal reflection in the GaAs conical waveguide with no cutoff losses. Additional metallization of the conical waveguide with gold of 80-nm thickness will provide additional focusing of the light to about 40-20 nm in diameter [Neacsu 2007] because of the surface plasmon effect.

This optical AFM probe utilizes the diode laser operating in pulsed mode under direct modulation of the injection current with low duty-cycle (~1-5%) to avoid heating of the AFM tip and imaging artifacts related to heating.

The AFM cantilever dimensions are chosen to provide performance similar to that of conventional Si AFM probes and accommodate the laser diode cavity and photodetector structures. Both the laser and photodetector epitaxial structures are identical but differ in terms of the biasing: the laser diode junction is biased in forward direction (electrons and holes recombine and create light); the reverse bias applied to the photodetector creates a depletion region where incident light will create electron/hole pairs, producing a photocurrent proportional to light intensity.

Figure 4:
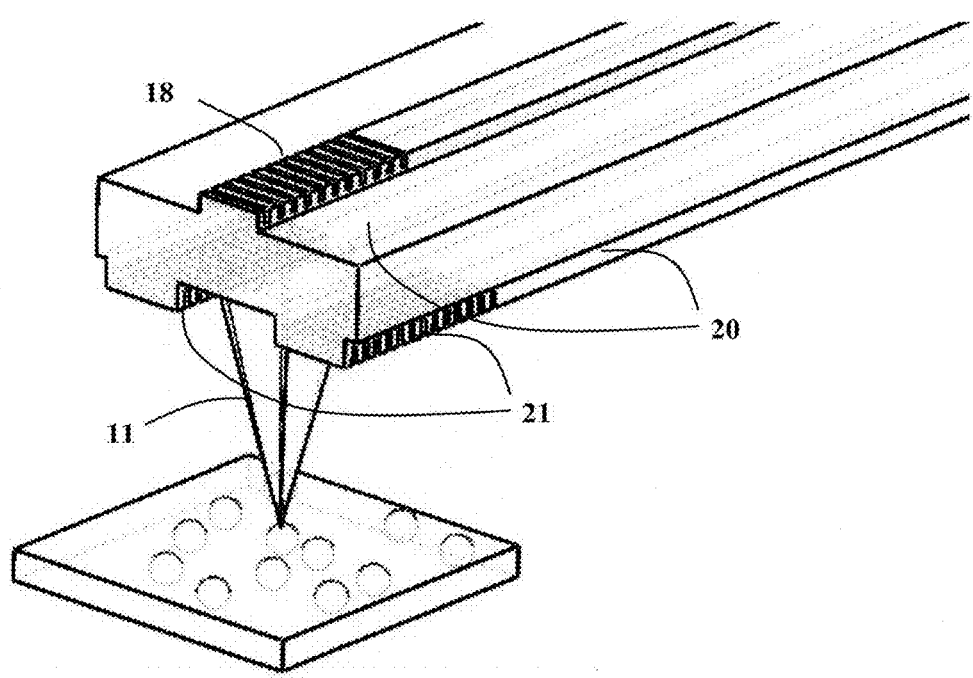
FIG. 4 is a 3-D illustration of the AAOP concept.

The AFM tip 11 is located directly underneath the second-order DBR grating 18. The light radiates from the apex of the tip that forms a point source. The tip is located between two photodetectors 20 that consist of stripes of the same material as the laser structure but reverse-biased (FIG. 4). The large detection area of the photodetectors of about 50×100 μm² provides high light collection efficiency. This point source, which is a source of light scattered from the sample under investigation, is less than 25 μm away from the detector. This close proximity of the source and the detectors also provides high collection efficiency for scattered near-field radiation. Second-order DBR gratings 21 fabricated on top of the photodetector structures couple the light scattered from the sample into the ridge waveguide photodetectors. By applying a voltage, the effective refractive index can be slightly altered [Codlren & Corzine 1995], thereby tuning the DBR grating for a specific Raman shift. By sweeping the voltage, this structure can work as a Raman spectrometer without moving parts.

Embodiment 2

Figure 5:
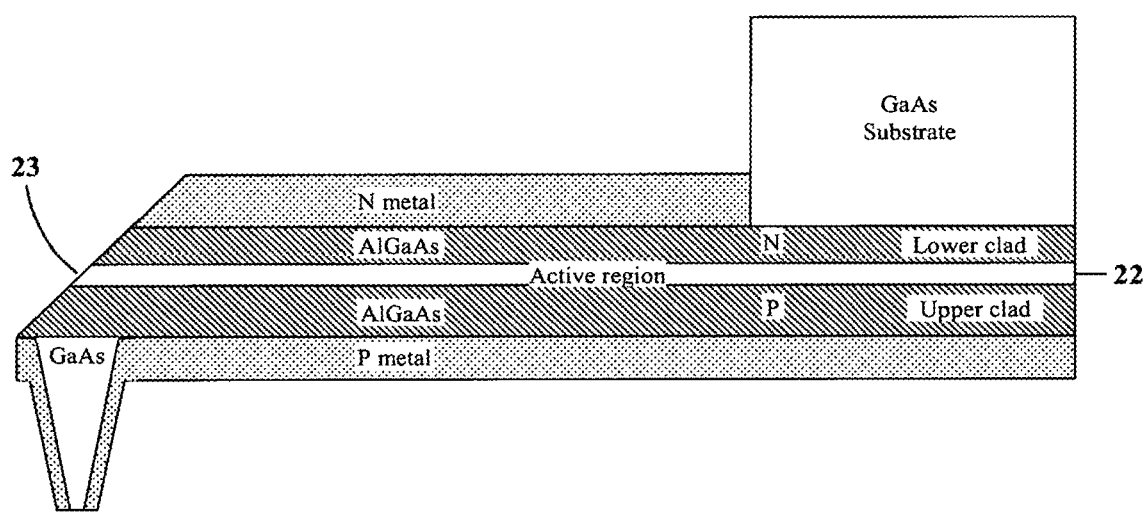
FIG. 5 is a schematic illustration of Embodiment 2 of a monolithic AFM active optical probe according to the invention.

In another embodiment of the present invention the mirrors #1 and #2 of the laser cavity can be in the form of facets obtained by cleaving or etching the laser wafer or by applying Focused Ion Beam (FIB) in proper directions (FIG. 5). For example, mirror #1 22 can be fabricated by cleaving or etching the wafer perpendicular to the epitaxial layers. Mirror #2 (the folding mirror) 23 can be fabricated using FIB applied in such a way as to create a flat surface at 45° with respect to the wafer surface.

Embodiment 3

Figure 6:
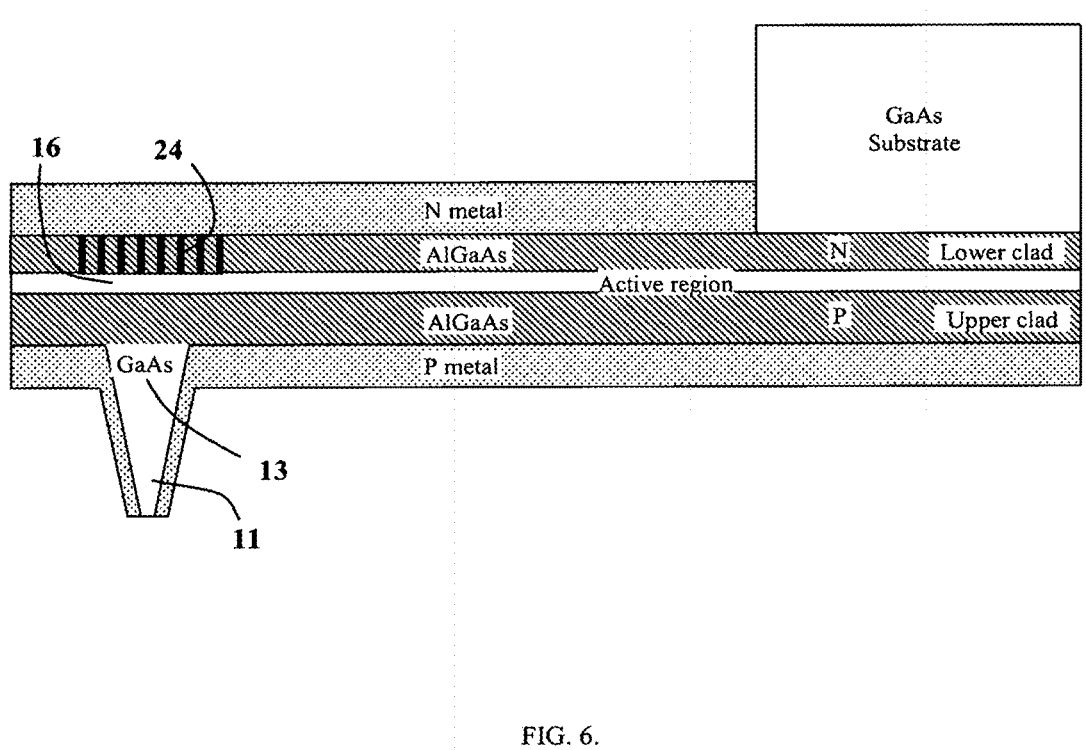
FIG. 6 is a schematic illustration of Embodiment 3 of a monolithic AFM active optical probe according to the invention.

In yet another embodiment of the present invention, the laser 16 is a second-order distributed feedback (DFB) surface-emitting laser that employs its second-order waveguide grating 24 to outcouple the laser light vertically into the AFM tip 11 fabricated from a specially grown GaAs epitaxial overcap layer 13 on top of the ridge waveguide (FIG. 6).

Again, the light generated by the laser is coupled into the surface mode of the GaAs probe tip (conic shape micro-prism) and transferred to the tip apex. Practice of the present invention can be easily extended to graded second-order DFB lasers for much more efficient power extraction in order to increase the optical power delivered to the GaAs probe tip. Graded second-order DFB lasers employ aperiodic gratings with symmetrically changing grating period to achieve a very significant enhancement of power extraction in vertical direction [Xu 2012].

In all embodiments, the ML AAOPs, including cantilevers and probe bases, are fabricated entirely from GaAs-based or similar lasing materials, thus avoiding the detrimental GaAs/Si hybridization.

Although certain embodiments of the invention have been described in detail herein, those skilled in the art will appreciate that modifications and changes can be made therein with the scope of the invention as set forth in the appended claims.

REFERENCES SITED

[Actoprobe 2015] "Atomic Force Microscopy Active Optical Probe", U.S. Pat. No. 9,482,691 issued Nov. 1, 2016.
[An 2008] K. H. An, B. O'Connor, K. P. Pipe, Y. Zhao, and M. Shtein, "Scanning probe optical microscopy using an integrated submicron organic photodetector," in Conference on Lasers and Electro-Optics/Quantum Electronics and Laser Science Conference and Photonic Applications Systems Technologies, p. CThLL3, Optical Society of America, 2008.
[Bargiel 2006] S. Bargiel, D. Heinis, C. Gorecki, A. Grecka-Drzazga, J. A. Dziuban, and M. Jzwik, "A micromachined silicon-based probe for a scanning near-field optical microscope on-chip," *Measurement Science and Technology*, vol. 17 (#1), p. 32, 2006.
[Celebrano 2009] M. Celebrano, P. Biagioni, M. Zavelani-Rossi, D. Polli, M. Labardi, M. Allegrini, M. Finazzi, L. Du'o, and G. Cerullo, "Hollow-pyramid based scanning near-field optical microscope coupled to femtosecond pulses: A tool for nonlinear optics at the nanoscale," *Review of Scientific Instruments*, vol. 80 (#3), p. 033704, 2009.
[Codlren & Corzine 1995] L. A. Coldren and S. W. Corzine, Diode Lasers and Photonic Integrated Circuits. New York, N.Y.: John Wiley & Sons, 1995.
[Heisig 2000a] S. Heisig, O. Rudow, and E. Oesterschulze, "Optical active gallium arsenide cantilever probes for combined scanning near-field optical microscopy and scanning force microscopy," *Journal of Vacuum Science & Technology B: Microelectronics and Nanometer Structures*, vol. 18 (#3), pp. 1134-1137, 2000.
[Heisig 2000b] S. Heisig, O. Rudow, and E. Oesterschulze, "Scanning near-field optical microscopy in the near-infrared region using light emitting cantilever probes," *Appl. Phys. Lett.*, vol. 77(#8), pp. 1071-1073, 2000.
[Hoshino 2008] K. Hoshino, L. J. Rozanski, D. A. V. Bout, and X. Zhang, "Near-field scanning optical microscopy with monolithic silicon light emitting diode on probe tip," *Appl. Phys. Lett.*, vol. 92 (#13), p. 131106, 2008.
[Hoshino 2009] K. Hoshino, A. Gopal, and X. Zhang, "Near-field scanning nanophotonic microscopy—breaking the diffraction limit using integrated nano light-emitting probe tip," *Selected Topics in Quantum Electronics, IEEE Journal of*, vol. 15 (#5), pp. 1393-1399, 2009.
[Kingsley 2008] J. W. Kingsley, S. K. Ray, A. M. Adawi, G. J. Leggett, and D. G. Lidzey, "Optical nanolithography using a scanning near-field probe with an integrated light source," *Appl. Phys. Lett.*, vol. 93 (#21), p. 213103, 2008.
[Neacsu 2007] C. C. Neacsu, S. Berweger, and M. B. Raschke, "Tip-enhanced raman imaging and nanospectroscopy: Sensitivity, symmetry, and selection rules," *NanoBiotechnology*, vol. 3 (#3-4), pp. 172-196, 2007.
[Novotny 2011] L. Novotny and N. van Hulst, "Antennas for light," *Nature Photonics*, vol. 5, pp. 83-90, 2011.
[Partovi 1999] A. Partovi, D. Peale, M. Wuttig, C. A. Murray, G. Zydzik, L. Hopkins, K. Baldwin, W. S. Hobson, J. Wynn, J. Lopata, et al., "High-power laser light source for near-field optics and its application to high-density optical data storage," *Appl. Phys. Lett.*, vol. 75(#11), pp. 1515-1517, 1999.
[Sasaki 2000] M. Sasaki, K. Tanaka, and K. Hane, "Scanning near-field optical microscope using cantilever integrated with light emitting diode, waveguide, aperture, and photodiode," in Optical MEMS, 2000 IEEE/LEOS International Conference on, pp. 129-130, 2000.
[Vedantam 2009] S. Vedantam, H. Lee, J. Tang, J. Conway, M. Staffaroni, and E. Yablonovitch, "A plasmonic dimple lens for nanoscale focusing of light," *NanoLett.*, vol. 9 (#10), pp. 3447-3452, 2009. PMID: 19739648.
[Xu 2012] G. Y. Xu, R. Colombelli, S. P. Khanna, A. Belarouci, X. Letartre, L. H. Li, E. H. Linfield, A. G. Davies, H. E. Beere, D. A. Ritchie, "Efficient power extraction in surface-emitting semiconductor lasers using graded photonic heterostructures", *Nature Communications*, vol. 3, Article Number 952 (2012).

We claim:

1. A monolithic atomic force microscopy active optical probe comprising:
   a base;
   a cantilever monolithically connected to the base;
   an atomic force microscopy probe tip monolithically integrated with the cantilever;
   a semiconductor laser source monolithically integrated into the cantilever or into both the cantilever and the base and delivering the laser light to the atomic force microscopy probe tip; and
   a photodetector, all fabricated from a semiconductor wafer with an epitaxial laser structure and monolithically integrated into a single semiconductor chip to enable atomic force microscopy measurements, optical imaging, and optical spectroscopy at the nanoscale.

2. The monolithic atomic force microscopy active optical probe of claim 1, wherein the semiconductor wafer has a GaAs-based epitaxial laser structure with a GaAs epitaxial layer overcapping the epitaxial laser structure.

3. The monolithic atomic force microscopy active optical probe of claim 2, wherein the cantilever is formed from the epitaxial layers of the wafer, and the atomic force microscopy probe tip is fabricated at the end of the cantilever from the GaAs epitaxial layer overcapping the epitaxial laser structure.

4. The monolithic atomic force microscopy active optical probe of claim 3 that can be used on an atomic force microscope.

5. The monolithic atomic force microscopy active optical probe of claim 4, wherein the semiconductor laser source is defined by fabricating two mirrors, mirror #1 and mirror #2, out of the epi-layers of the GaAs-based laser structure, and the two fabricated mirrors define a laser cavity.

6. The monolithic atomic force microscopy active optical probe of claim 5, wherein mirror #1 is a first-order distributed Bragg reflector grating and mirror #2 is a second-order distributed Bragg reflector grating that serves as a folding mirror to couple the laser light vertically into the atomic force microscopy probe tip.

7. The atomic force microscopy active optical probe of claim 5, wherein mirror #1 and mirror #2 of the laser cavity are in the form of facets or edges obtained by etching or cleaving the laser wafer, or by applying focused ion beam in proper directions:

mirror #1 is fabricated by etching or cleaving the wafer perpendicular to the epitaxial layers;

mirror #2, the folding mirror, is fabricated by wet or dry etching or by focused ion beam applied in such a way as to create a flat surface at an angle of 45 degrees or close to 45 degrees with respect to the wafer surface.

8. The monolithic atomic force microscopy active optical probe of claim 4, wherein the semiconductor laser source is a second-order distributed-feedback surface-emitting laser that has a second-order waveguide grating to outcouple the laser light vertically into the probe tip.

9. The monolithic atomic force microscopy active optical probe of claim 8, wherein the second-order distributed-feedback surface-emitting laser is a graded second-order distributed-feedback sin-face-emitting laser that ensures more efficient power extraction to increase the optical power delivered to the probe tip.

10. The monolithic atomic force microscopy active optical probe of claim 1, wherein the optical probe is fabricated from a semiconductor wafer with an epitaxial laser structure based on one of the following semiconductor laser materials: InP, GaP, GaSb, or GaN, to expand the available wavelength coverage for the integrated laser source and photodetector from ultraviolet to visible and mid-infrared.

\* \* \* \* \*